US011042691B2

(12) United States Patent
Itoh et al.

(10) Patent No.: US 11,042,691 B2
(45) Date of Patent: Jun. 22, 2021

(54) EDITING ELECTRONIC DOCUMENTS

(71) Applicant: INTERNATIONAL BUSINESS MACHINES CORPORATION, Armonk, NY (US)

(72) Inventors: Harumi Itoh, Machida (JP); Eisuke Kanzaki, Fujisawa (JP)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 16/691,656

(22) Filed: Nov. 22, 2019

(65) Prior Publication Data

US 2020/0089742 A1 Mar. 19, 2020

Related U.S. Application Data

(63) Continuation of application No. 13/454,578, filed on Apr. 24, 2012, now Pat. No. 10,503,813, which is a continuation of application No. PCT/JP2010/068377, filed on Oct. 19, 2010.

(30) Foreign Application Priority Data

Oct. 29, 2009 (JP) ................. 2009-249279

(51) Int. Cl.
*G06F 40/117* (2020.01)
*G06F 40/106* (2020.01)
*G06T 11/60* (2006.01)
*G06F 40/131* (2020.01)

(52) U.S. Cl.
CPC .......... *G06F 40/117* (2020.01); *G06F 40/106* (2020.01); *G06F 40/131* (2020.01); *G06T 11/60* (2013.01)

(58) Field of Classification Search
CPC ..... G06F 40/106; G06F 40/117; G06F 40/131
See application file for complete search history.

(56) References Cited

U.S. PATENT DOCUMENTS 6,308,188 B1 10/2001 Bernardo et al.
6,697,825 B1 2/2004 Underwood et al.
6,732,332 B1 5/2004 Borysewicz et al.
(Continued)

FOREIGN PATENT DOCUMENTS

CN 1831763 9/2006
CN 1859560 11/2006
(Continued)

OTHER PUBLICATIONS

Jessica Mantaro, FrontPage 2003: The Missing Manual, Aug. 18, 2005, O'Reilly Media, Inc., pp. 1-67 (Year: 2005).*
(Continued)

*Primary Examiner* — Scott T Baderman
*Assistant Examiner* — Seung Woon Jung
(74) *Attorney, Agent, or Firm* — Christopher Pignato; Andrew M. Calderon; Roberts Calderon Safran & Cole, P.C.

(57) ABSTRACT

A theme to be applied to a document to be edited can be identified. The document and a preview of one or more components insertable into the document can be displayed. The preview can be formed and presented prior to the insertion of at least one of the components by applying the identified theme to the components.

19 Claims, 14 Drawing Sheets

(56) References Cited

U.S. PATENT DOCUMENTS

| | | |
|---|---|---|
| 7,536,641 B2 | 5/2009 | Rosenstein et al. |
| 7,602,396 B2 | 10/2009 | Asente et al. |
| 2004/0205594 A1 | 10/2004 | Arora et al. |
| 2005/0028088 A1 | 2/2005 | Nagayama |
| 2005/0132284 A1 | 6/2005 | Lloyd et al. |
| 2005/0278625 A1 | 12/2005 | Wessling et al. |
| 2006/0036950 A1 | 2/2006 | Himberger et al. |
| 2006/0129926 A1 | 6/2006 | Malek et al. |
| 2006/0206836 A1* | 9/2006 | Wessling ............... G06F 9/451 715/810 |
| 2007/0061714 A1 | 3/2007 | Stuple et al. |
| 2007/0083851 A1* | 4/2007 | Huang ................ G11B 27/034 717/113 |
| 2008/0109472 A1 | 5/2008 | Underwood et al. |
| 2008/0182628 A1 | 7/2008 | Lee et al. |
| 2008/0267536 A1* | 10/2008 | Moroney ............... G06T 11/60 382/311 |
| 2010/0083170 A1* | 4/2010 | Lim ...................... G06Q 30/02 715/810 |
| 2011/0016487 A1 | 1/2011 | Chalozin et al. |
| 2012/0179993 A1 | 7/2012 | Himberger et al. |
| 2012/0210210 A1 | 8/2012 | Itoh et al. |
| 2012/0254721 A1 | 10/2012 | Jain et al. |
| 2017/0205971 A1 | 7/2017 | Himberger et al. |

FOREIGN PATENT DOCUMENTS

| | | |
|---|---|---|
| CN | 101312472 | 11/2008 |
| CN | 102713896 | 10/2012 |
| CN | 2010849142 | 10/2012 |
| EP | 1628198 A2 | 2/2006 |
| EP | 2495667 | 5/2012 |
| JP | 2001222721 | 8/2001 |
| JP | 2003271510 | 9/2003 |
| JP | 2005084936 | 3/2005 |
| JP | 2005292964 | 10/2005 |
| JP | 2007509402 | 4/2007 |
| JP | 2009006573 | 1/2009 |
| JP | 2009016797 | 1/2009 |
| TW | 1282926 | 6/2007 |
| TW | 200828038 | 7/2008 |
| TW | 201115362 | 5/2011 |
| TW | 20100118952 | 5/2011 |
| WO | 200131492 | 5/2001 |
| WO | 200219153 | 3/2002 |
| WO | 2006083987 | 8/2006 |
| WO | 2011052431 | 5/2011 |

OTHER PUBLICATIONS

Jessica Mantaro, FrontPage 2003_The Missing Manual, Aug. 18, 2005, O'Reilly Media, Inc., 58 pages.

Yuki Takami, Homepage Builder 13 Parfect Master [Version 13/12/11/10], Kazen T, Apr. 15, 2009, Shuwa System Co., Ltd, Japan, pp. 204-205.

Miho Matsumo, Nov. 1, 2009, Kagakusha, Tokyo, Japan, vol. 34, NR:11, pp. 7-9.

Kaori Inoue, "Techinical Preview of a new product that is due to appear in the next year, Office 2010, Key Points of the new functions", Nikkei PC, Japan, Nikkei Business Publications, Inc., Sep. 14, 2009, No. 585, pp. 48-53.

Yamauchi et al. Power Point 2007, Perfect Master Japan Shuwa System Co, Ltd, Feb. 1, 2008 the first editions in the first print run, pp. 255-258.

Heslop B. et al.: "Illustrating Your Documents with Graphics", Jan. 1, 2003 (Jan. 1, 2003), Microsoft Office Word 2003, B, Wiley Publishing, US, pp. 437-464.

European Search Report dated Dec. 12, 2017 in related EP Application No. 10826563.8, 8 pages.

Ellen Finkelstein, Recolor graphics in PowerPoint 2007 found at http://www.ellenfinkelstein.com/pptblog/recolor-graphics-inpowerpoint-2007/, Jan. 7, 2004, PowerPoint Tips Blog, pp. 1-5.

Tim Bray et. al, "Extensible Markup Language (XML) 1.1 (Second Edition)," World Wide Web Consortium, 29 [8J Sep. 2006.

Bert Bos, et. al, "Cascading Style Sheets Level 2 Revision 1 (CSS 2.1) Specification," World Wide Web Consortium, Sep. 8, 2009.

Dave Raggett, et. al, "HTML 4.01 Specification," World Wide Web Consortium, Dec. 12, 1999.

\* cited by examiner

```
<selection name="Monotone" id="hpb9tm05_8">
        <description>Faint Monotone Theme</description>
        <css path="08">hpb9tm05_8.css</css>
        <preview path="08">hpb9tm05_8.gif</preview>
        <button path="button">05btn13.mif</button>
        <logo path="logo">05log15.mif</logo>
        <themecolor>grey</themecolor>
        <themebgcolor>silver</themebgcolor>
        <themetrans_color>monochrome</themetrans_color>
        <themetrans_shape>none</themetrans_shape>
        <themetrans_border>none</themetrans_border>
        <themetrans_contrast>none</themetrans_contrast>
        <themetrans_temparature>none</themetrans_temparature>
        <themetrans_colortemp>none</themetrans_colortemp>
</selection>
```

FIG. 12

```
<HTML>
<HEAD>
<LINK href="hpb9tm05_8.css" rel="stylesheet" type="text/css"
id="hpb9tm05_8">
</HEAD>
<BODY>

.....

<TABLE border="0" align="center" cellpadding="0" cellspacing="0"
class="hpd-lb-tb1">
<TBODY>
  <TR>
      <TD class="hpb-lb-tb1-cell4">Recomendations</TD>
  </TR>
  <TR>
      <TD class="hpb-lb-tb1-cell3"></BR>
      <BR>
      <TABLE width=100%" border="0" cellpadding="0" cellspacing="0"
class="hpb-dp-tb4">
      <TBODY>
  <TR>
          <TD align="left" valign="top" class="hpb-dp-tb4-cell8">Enjoy
shopping at xxx-eStore - plus free shipping!
  </TD>
    </TR>

.....

</BODY>
</HTML>
```

FIG. 13

```html
<HTML>
<HEAD>
<LINK href="hpb9tm05_8.css" rel="stylesheet" type="text/css" id="hpb9tm05_8">
</HEAD>
<BODY>

.....

<TABLE border="0" align="center" cellpadding="0" cellspacing="0" class="hpd-lb-tb1">
<TBODY>
   <TR>
        <TD class="hpb-lb-tb1-cell4">Recomendations</TD>
   </TR>
   <TR>
        <TD class="hpb-lb-tb1-cell3"></BR>
        <BR>
        <TABLE width=100%" border="0" cellpadding="0" cellspacing="0" class="hpb-dp-tb4">
<TBODY>
            <TR>
                <TD align="left" valign="top" class="hpb-dp-tb4-cell8"><IMG src="file:///C:/Documents and settings/user/Application Data/application/tmp/hpb9tm05_8/ anl016.gif" width="149" height="148" border="0">Enjoy shopping at xxx-eStore - plus free shipping! </TD>
     </TR>

.....

</BODY>
</HTML>
```

FIG. 14

EDITING ELECTRONIC DOCUMENTS

CROSS REFERENCE TO RELATED APPLICATIONS

This application claims priority of Japanese Application No. 2009-249279 entitled "SYSTEM, METHOD, AND PROGRAM FOR EDITING ELECTRONIC DOCUMENT", filed on Oct. 29, 2009.

BACKGROUND

The present invention relates to a method, system, and program for editing electronic documents.

With the recent widespread use of the Internet, companies and individuals have created multimedia web contents and published them on the Internet on a regular basis. In general, web contents are created as multimedia structured electronic documents that follow the format of HTML or XML.

In order to help with web content creation, authoring software with an editor capable of outputting, as a web content such as an HTML document, a content exactly as viewed on a display screen during creation and editing of a content has been offered. Such an editor is called a WYSIWYG (What You See Is What You Get) editor. For example, International Business Machines Corporation as the applicant offers IBM WebSphere Studio Homepage Builder® as software with WYSIWYG editor.

BRIEF SUMMARY

One embodiment of the disclosure is for a method for editing an electronic document. In the embodiment, a theme to be applied to a document to be edited can be identified. The document and a preview of one or more components insertable into the document can be displayed. The preview can be formed and presented prior to the insertion of at least one of the components by applying the identified theme to the components.

One embodiment of the disclosure is for a system for editing an electronic document. In the embodiment, the system includes one or more processors, one or more computer-readable memories and one or more computer-readable, tangible storage devices. The system can also include program instructions that are stored on the at least one of the one or more storage devices for execution by at least one of the one or more processors via at least one of the one or more memories. The program instructions can identify a theme to be applied to a document to be edited. The program instructions can display the document and a preview of one or more components insertable into the document. The preview can be formed and presented prior to the insertion of at least one of the components by applying the identified theme to the components.

One embodiment of the disclosure is for a computer program product for editing an electronic document. In the embodiment, the computer program product includes one or more computer-readable storage devices and program instructions, stored on at least one of the one or more storage devices. The program instructions can identify a theme to be applied to a document to be edited. The program instructions can display the document and a preview of one or more components insertable into the document. The preview can be formed and presented prior to the insertion of at least one of the components by applying the identified theme to the components.

BRIEF DESCRIPTION OF THE SEVERAL VIEWS OF THE DRAWINGS

FIG. 12 shows an example of a theme in an embodiment of the present invention.

FIG. 13 shows an example of an HTML source (before material is inserted) of an editing target document in an embodiment of the present invention.

FIG. 14 shows the example of the HTML source (after material is inserted) of the editing target document in an embodiment of the present invention.

DETAILED DESCRIPTION

Figure 1:
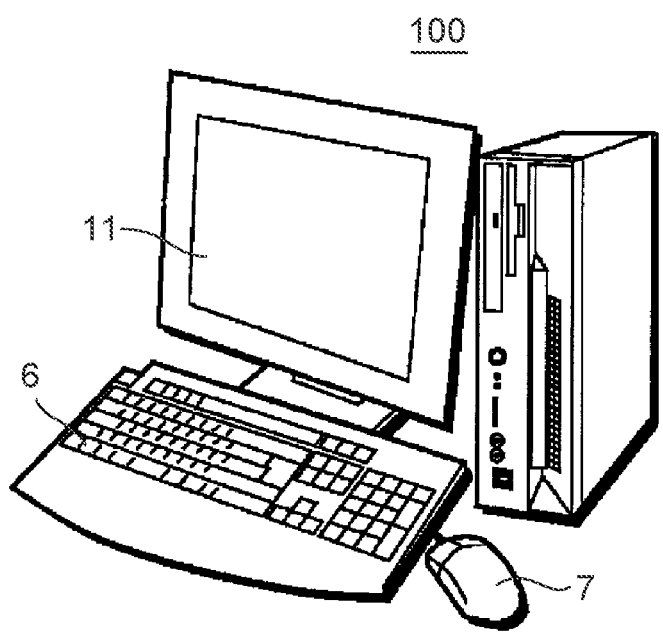
FIG. 1 is a view showing an example of appearance of a data processing system according to an embodiment of the present invention.

IBM WebSphere Studio Homepage Builder offers users the function of inserting a material into an editing target document by performing a material insert action to select a preview of the material (a kind of document component) from a material view in a drag-and-drop manner. In IBM WebSphere Studio Homepage Builder, when a theme is selected for the editing target document, the theme is applied to the material in response to the drag-and-drop operation and inserted into the editing target document.

However, no user can recognize what the material looks like at the end unless the material is inserted. Therefore, for example, when the material to which an actually inserted theme has been applied is different from the user's previous image, the user may be forced to try to find an appropriate material many times. This problem of reducing user's convenience cannot be solved by any of the aforementioned related arts.

Therefore, there is a need discovered during the course of developing embodiments of the invention to provide a system, software, and method for efficiently supporting editing of an electronic document.

More specifically in one embodiment, there is provided a system, method, and computer program product for editing an electronic document. This system includes means for identifying a theme to be applied to a document to be edited, and means for displaying the document and a preview of one or more components to be inserted into the document. The preview is formed and presented prior to the insertion of at least one of the components by applying the identified theme to the one or more components. The preview may be formed by applying a set of one or more attribute parameters associated with the identified theme to the one or more components.

In one embodiment, the system, method, and/or computer program product further includes a means for identifying at least one of the one or more components in response to a predetermined user action and inserting the component into the document. An example of the predetermined user action is drag-and-drop. The system may further include means which, when at least one of the one or more components is to be inserted into the document, applies at least some of a set of attribute parameters are applied to convert the component.

Further, the system, method, and/or computer program product may include a means for selecting a position at which a component(s) is inserted in the document, wherein a set of attribute parameters is determined according to information on the selected position and a preview of the component(s) to which the determined parameters have been applied is displayed.

The system, method, and/or computer program product may include a means for allowing a user to select some of the set of attribute parameters to be applied to the document, wherein a preview of components to which some of the selected attribute parameters have been applied is displayed. In this case, the system can further include means for inserting, into the document, the components to which some of the selected attribute parameters have been applied.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the present invention will now be described with reference to the accompanying drawings. It should be noted that the following embodiment does not limit the inventions described in the scope of claims, and not all the combinations of features described in the embodiment are requisites as resolving means of the present invention.

FIG. 1 shows an example of appearance of an authoring system 100 according to an embodiment of the present invention. The authoring system according to the embodiment of the present invention includes a keyboard 6, a mouse 7, and a display device 11.

A user can operate input devices such as the keyboard 6 and the mouse 7 through a window-based graphical user interface for visually presenting information on working conditions and the like onto the display device 11 of the authoring system to edit a web page as a kind of electronic document in an interactive manner. A WYSIWYG editor and a preview of multiple materials are displayed in a window, and a material view for providing the user with the function of inserting, into the editing target document, a material selected from the preview is displayed simultaneously.

In an embodiment of the present invention, when a theme is set for the editing target document, not only the document itself displayed in the WYSIWYG editor but also the preview of the multiple materials displayed in the material view are so converted that the theme will also be applied thereto. The user selects a material converted to be applied with the theme while viewing the material preview images and performs an insert action. The example of the material insert action in the embodiment of the present invention is drag and drop from the material view of the material preview images to an edit view. In an embodiment of the present invention, an image after the material is inserted can be grasped before the material is actually inserted into the document, thereby improving user convenience.

Figure 2:
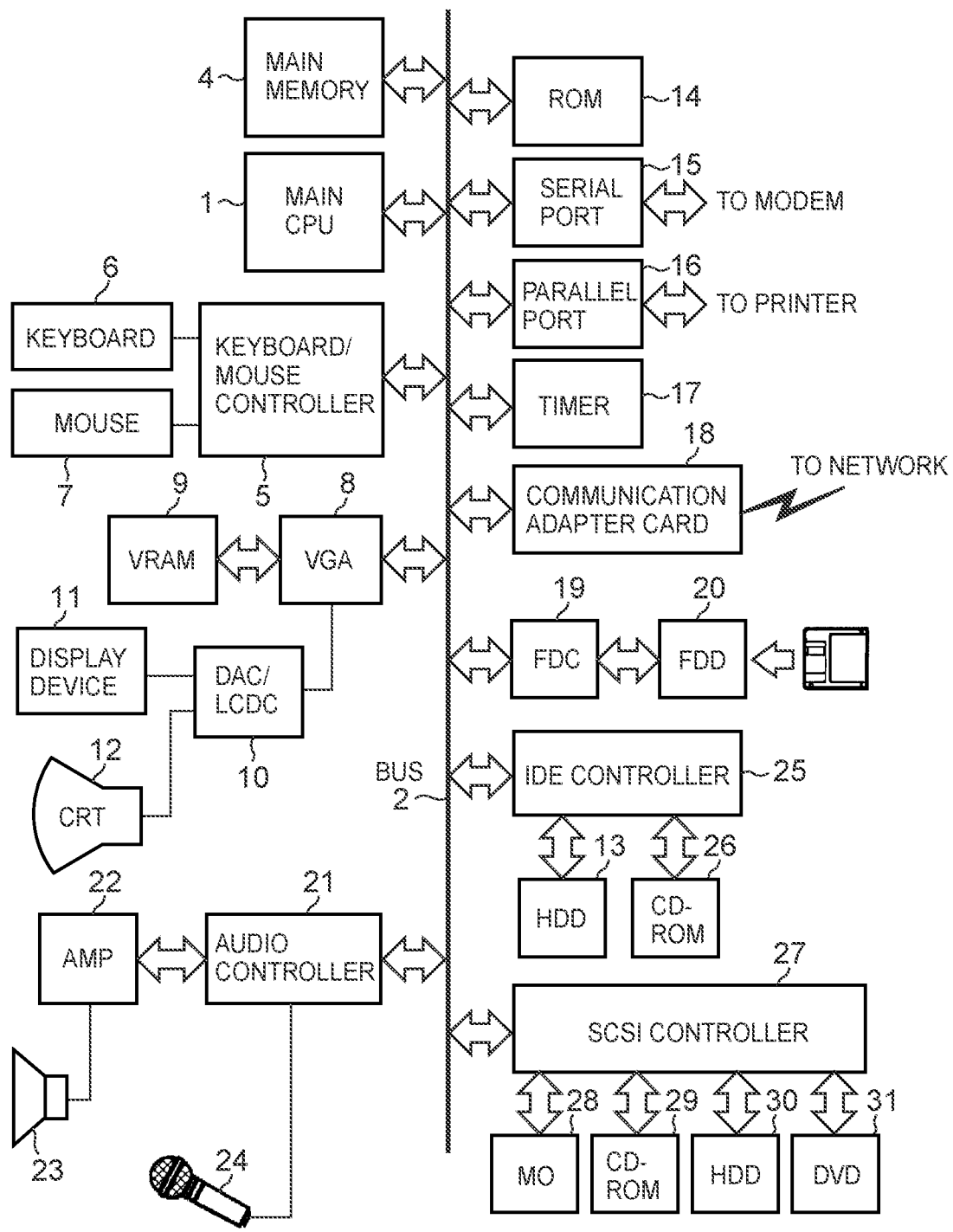
FIG. 2 is a block diagram showing an example of hardware configuration of an information processing apparatus suited to implement the data processing system according to an embodiment of the present invention.

FIG. 2 is a block diagram showing an example of hardware configuration of an information processing apparatus suited to implement the authoring system 100 according to an embodiment of the present invention. The information processing apparatus includes a CPU (central processing unit) 1 and a main memory 4, both connected to a bus 2. Removable storages (an external storage system capable of replacing recording media) such as hard disk drives 13, 30, CD-ROM drives 26, 29, a flexible disk drive 20, an MO drive 28, and a DVD drive 31 are connected to the bus 2 via a floppy disk controller 19, an IDE controller 25, a SCSI controller 27, and the like.

Storage media such as flexible disk, MO, CD-ROM, DVD-ROM, etc. are inserted into the removable storages. These storage media, the hard disk drives 13, 30, and a ROM 14 can record the codes of a computer program for giving instructions to the CPU and the like in cooperation with an operating system to carry out embodiments of the present invention. The computer program is loaded into the main memory 4 and executed. The computer program can also be compressed, or divided into two or more parts and recorded on two or more media.

The information processing apparatus receives input from the input devices such as the keyboard 6 and the mouse 7 via a keyboard/mouse controller 5. The information processing apparatus is connected to the display device 11 via a DAC/LCDC 10 for presenting visual data to the user.

The information processing apparatus can be connected to a network through a network adapter 18 (Ethernet® card or token ring card) or the like to communicate with other computers and the like. Though not shown, a printer and a modem can also be connected through a parallel port and a serial port, respectively.

It is readily understood from the above description that the information processing apparatus suited to implement the authoring system according to an embodiment of the present invention is implemented as an information processing apparatus such as a general personal computer, workstation, mainframe computer, or the like, or a combination thereof. It should be noted that these components are just illustrative and not all the components are requisites for all embodiments of the present invention.

Various changes, such as to combine two or more machines and allocate functions among them, to implement each component in the hardware configuration of the information processing apparatus used in an embodiment of the present invention can, of course, be readily contemplated by those skilled in the art. These changes are to be naturally included in the concept of embodiments of the present invention.

The authoring system of the embodiment of the present invention employs an operating system for supporting a GUI (graphical user interface) multi-window environment, such as Windows® operating system offered by Microsoft corporation, Mac OS® offered by Apple Computer Inc., or a UNIX® system with an X Window System (e.g., AIX® offered by International Business Machines Corporation).

From the above description, it can be understood that the authoring system used in the embodiment of the present invention is not limited to a specific multi-window operating system environment.

Figure 3:
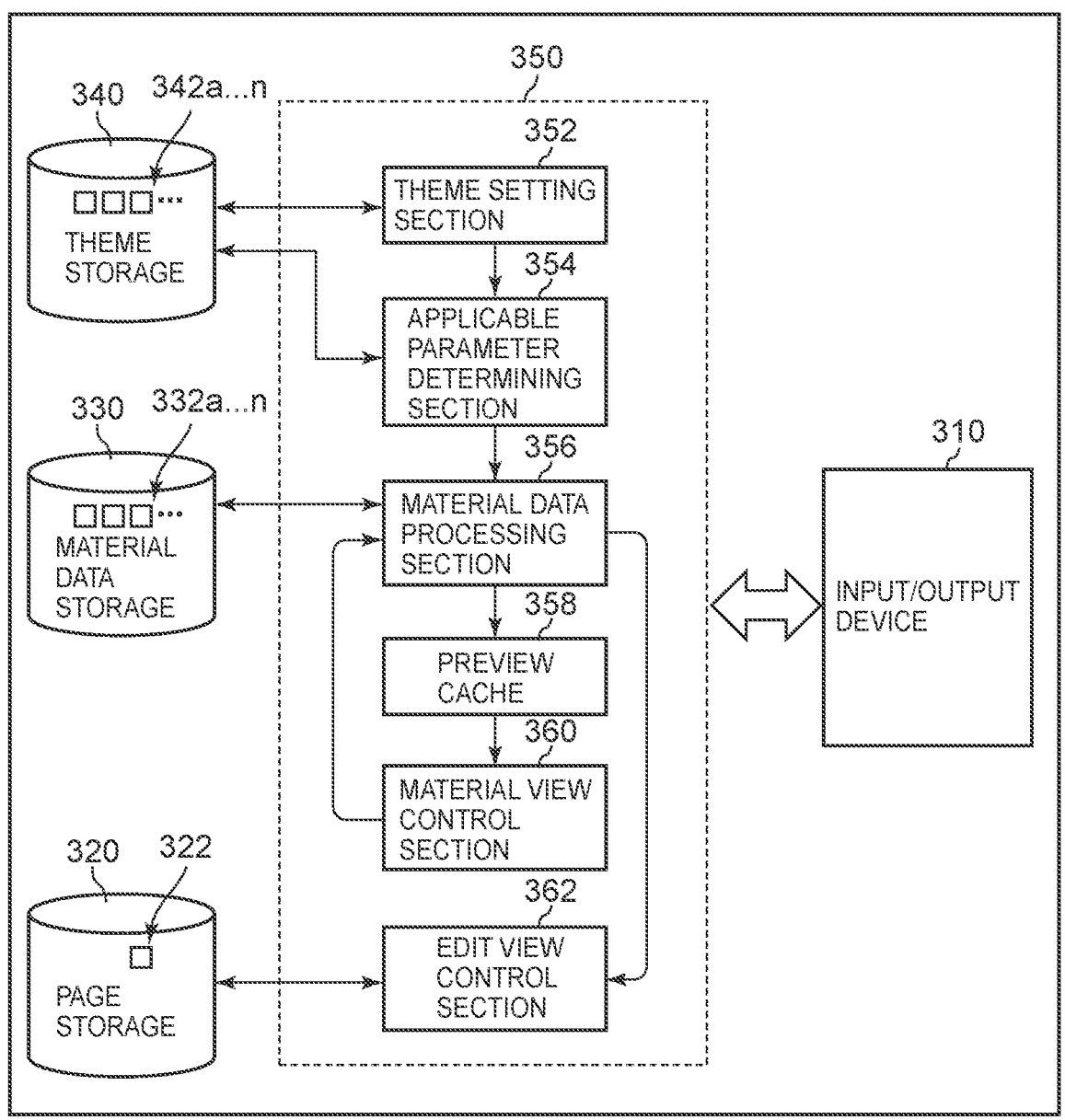
FIG. 3 is a functional block diagram of an authoring system according to an embodiment of the present invention.

FIG. 3 is a functional block diagram of the authoring system 100 of an embodiment of the present invention. Note that each block in the functional block diagram of FIG. 3 can be implemented in the information processing apparatus having the hardware configuration illustrated in FIG. 2 by making the CPU 1 read computer programs such as the operating system and the authoring software stored in the hard disk drive 13 or the like after loaded to the main memory 4 to cooperate the hardware resources with the software.

The authoring system 100 of the embodiment of the present invention includes an input/output device 310, editing page storage 320, a material data storage 330, a theme storage 340, and authoring software 350. The input/output device 310 has the function of displaying a graphical user interface or the like for creating content on a desktop screen of the operating system in accordance with instructions of the authoring software 350. The input/output device 310 also has the function of receiving operations and input of data for creating content from the user operating the data processing system 100.

The editing page storage 320 of an embodiment of the present invention stores data on editing target document 322 as a web page created by the authoring software 350. In an embodiment of the present invention, such an editing target document 322 is created in HTML language format.

The material data storage 330 of the embodiment of the present invention stores material data 332a . . . n as page components (elements) to be inserted in the editing target document 332. In an embodiment of the present invention, the material data can include, but is not limited to, any of image data, animation data, vector data, text data, and HTML data, or a combination of these data. The user of the authoring software 350 can interactively select and insert, into the page, a material stored in the material data storage 330.

The material data storage 330 of an embodiment of the present invention also stores, for each of the material data 332a . . . n, the material type (photo, graphic, or character), the material category, information on the availability of shape transformation of the material, and information on the availability of color translation of the material. These pieces of information are considered upon material conversion to be described later.

The theme storage 340 of the embodiment of the present invention stores data on theme (color, layout, etc.) with a sense of unity and to be applied to the editing target document. The user of the authoring software 350 can interactively select, from themes 342a . . . n stored in the theme storage 340, a theme to be applied to the editing target document 322, and apply the theme to the page, creating a web content with a sense of unity.

FIG. 12 shows an example of theme ("pastel monotone" theme) in the embodiment of the present invention. In the embodiment of the present invention, the theme consists of a set of parameters specified in XML language format, and is created as a file (theme file) separately from the editing target document. For example, the file name of the theme file may be " . . . theme.xml." Two or more themes the user can designate may be designated in a single file alone or across two or more files. Each of tags <themecolor>, <themebgcolor>, <themetrans_color>, <themetrans_shape>, <themetrans_border>, <themetrans_contrast>, <themetrans_temparature>, <themetrans_colortemp> in the embodiment of the present invention is used to designate an attribute parameter to be applied to a material to be inserted. An applicable parameter determining section 354 and a material data processing section 356 of the authoring software 350 interpret at least some of these attribute parameters, and apply the parameters to materials to convert the materials, forming a preview of materials and instances insertable into an editing target document along with a corresponding theme.

TABLE 1

| TAG | DESIGNATED CONTENT | DESIGNATION METHOD |
| --- | --- | --- |
| <description> | Description of theme | Free text input |
| <css path> | Location where CSS file to be referred to by editing target document resides | File path/file name (e.g., hpb9tm05_8.css) |
| <preview path> | Location where preview image file representing impression of theme resides | File path/file name (e.g., hpb9tm05_8.gif) |
| <button path> | Location where button data according to theme resides | File path/file name (e.g., 05btn13.mif) |
| <logo path> | Location where logo data according to theme resides | File path/file name (e.g., 05log15.mif) |
| <themecolor> | Main color to represent theme | Color name (e.g., red) or RGB# (e.g., #33FFAA) |
| <themebgcolor> | Main background color to represent theme | Color name (e.g., red) or RGB# (e.g., #33FFAA) |
| <themetrans_color> | Color translation method according to theme | Color translation method name and value (e.g., monochrome, light) |

TABLE 1-continued

| TAG | DESIGNATED CONTENT | DESIGNATION METHOD |
| --- | --- | --- |
| <themetrans_shape> | Shape transformation method according to theme | Shape transformation method name and value (e.g., round, light) |
| <themetrans_border> | Frame adding method according to theme | Frame adding method name and value (e.g., kabuki, medium) |
| <themetrans_contrast> | Contrast conversion method according to theme | Contrast name or value (ex.1: high, ex.2: 255) |
| <themetrans_temperature> | Temperature conversion according to theme | Temperature conversion method and temperature name or value (ex.1: hot, ex.2: 35) |
| <themetrans_colortemp> | Color temperature conversion according to theme | Color temperature conversion method and color temperature name or value (ex.1: daylight, ex.2: 5600) |

The above has described, with reference to FIG. 12, one example of theme in the embodiment of the present invention, which includes CSS file designation and other parameters set in accordance with the XML specification. Since the XML and CSS language specifications are well known from aforementioned Non-Patent Document 1 and Non-Patent Document 2 to those skilled in the art, a person skilled in the art can implement the creation process appropriately after reading this specification. Therefore, further detailed description will be omitted.

Returning to FIG. 3, the authoring software 350 of an embodiment of the present invention accesses the editing target document 322 stored in the page storage 320, and provides the user with the function of editing the content in an interactive manner by showing, on the display device 11 of the authoring system 100, a graphical user interface like a window 900 shown in FIGS. 9 to 11 to be described later. The authoring software 350 includes a theme setting section 352, an attribute parameter determining section 354, a material data processing section 356, a preview cache 358, a material view controller 360, and an edit view controller 362.

The theme setting section 352 of the embodiment of the present invention has the functions of allowing the user to select, from multiple themes stored in the above-mentioned theme storage 340, a theme to be applied to the editing target document 322 and identifying the theme. It also has the function of setting an additional sub-parameter for the selected theme, such as the degree of reflecting the theme or which parameter in the theme should be reflected.

The attribute parameter determining section 354 of the embodiment of the present invention has the function of determining a set of parameters finally to be applied to the material based on the theme selected by the theme setting section 352 and the sub-parameter. In an embodiment of the present invention, the parameters determined by the attribute parameter determining section 354 are applied to the material by the material data processing section 356, resulting in converting the material.

The material data processing section 356 of the embodiment of the present invention has the function of retrieving corresponding material data from the material data storage 330 in accordance with an instruction from the material view processing section 360 (e.g., an instruction caused by a material insert action such as to drag and drop the material displayed in the material view to the page in the edit view), applying parameters determined by the attribute parameter determining section 354 to convert the material, and handing it over to the edit view control section 362. The material data processing section 356 also has the function of retrieving material data from the material data storage 330 to create preview data from the material data in accordance with an instruction from the material view processing section 360 (e.g., an instruction to present a material preview into a material view), applying at least some of the set of parameters determined by the attribute parameter determining section 354 to convert the material in order to create preview images, and handing them over to the preview cache 358.

The preview cache 358 is a storage area for temporary storage of preview data on respective materials converted by the material data processing section 356. The preview data stored in the preview cache 358 can be refreshed by a change in theme or the like.

The material view control section 360 presents, as a material box, the preview data stored in the preview cache 358, and generates and sends an instruction to perform processing related to the material data processing section 356 in response to the material insert action such as to drag and drop a material displayed in the material box to the page in the edit view.

The edit view control section 362 provides a content creator with an edit view 920 used in editing the editing target document 322. In the embodiment of the present invention, the edit view 920 is a WYSIWYG editor, which has the function of being able to output a web content such as an HTML document as it is seen on the display screen.

Figure 4:
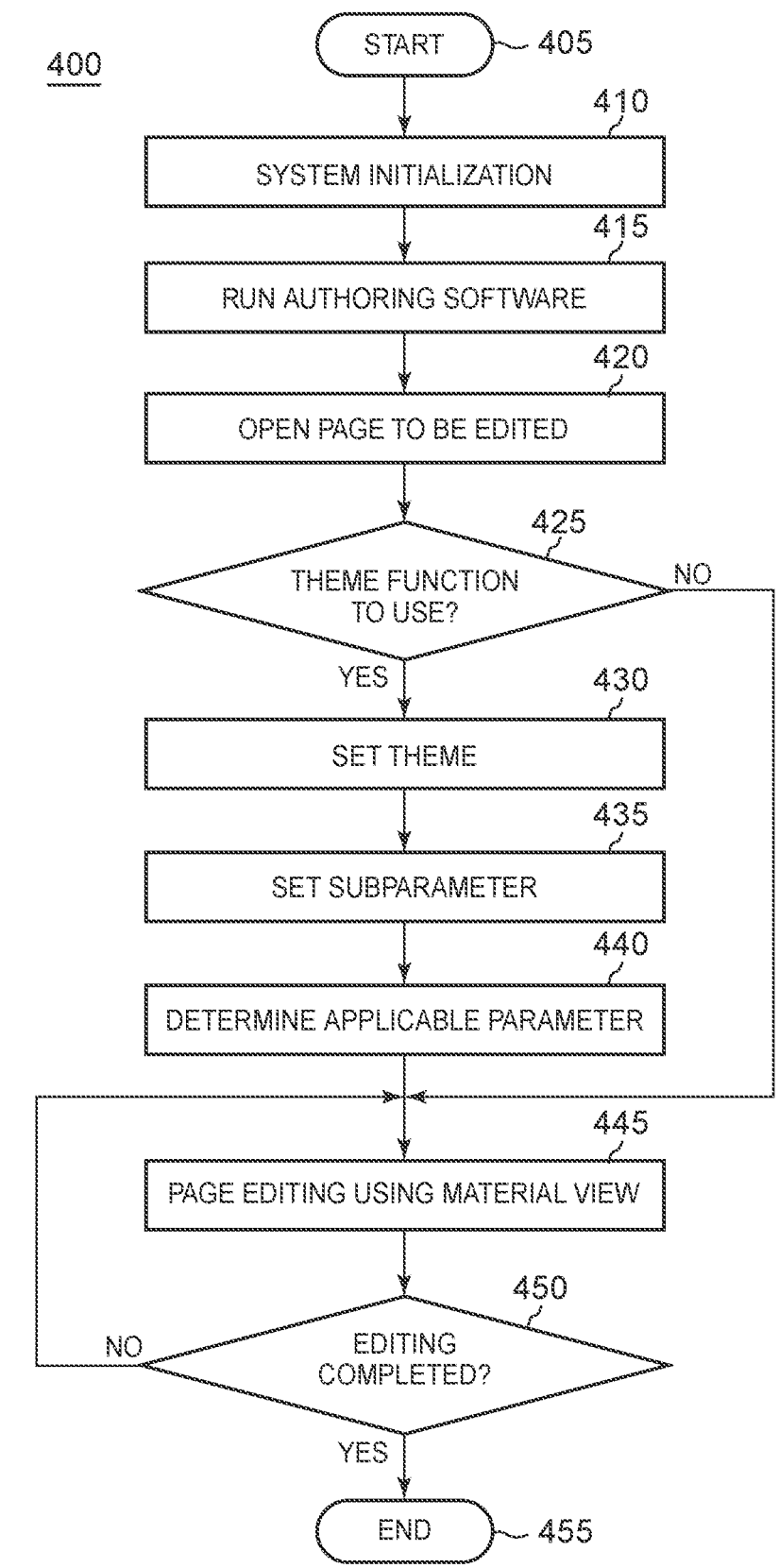
FIG. 4 is a flowchart illustrating the operation of the authoring system according to an embodiment of the present invention.

FIG. 4 is a flowchart 400 illustrating the operation of the authoring system 100 according to an embodiment of the present invention. This processing starts at step 405, and the system is initialized in step 410 such as to turn on the power supply and to load BIOS and the operating system. Next, in step 415, the authoring software 350 is activated in response to a user action to run the application (e.g., double click on an icon representing the authoring software 350 on the desktop). In response to the activation of the authoring software 350, the operating system generates a window corresponding to the activated authoring software 350 on the desktop screen of the multi-window operating system displayed on the display device.

Then, processing proceeds to step 420 in which the user opens the editing target document 322. In the embodiment of the present invention, the authoring software 350 reads data on the editing target document 322 from the page storage 320 in response to opening of the editing target document 332 as a web page, and displays it on the screen. For example, step 420 can be executed by double click on an icon corresponding to an existing document on the desktop. Step 420 can also be executed by selecting "new document creation" from a pull-down menu to create a new document. In this case, new page data is formed in the page storage 320. In either case, since this step is well known, those skilled in the art can execute this step appropriately. Therefore, further detailed description will be omitted here.

Then, processing proceeds to step 425 to determine whether to use a theme. If it is determined in step 425 that no theme is used, processing proceeds to step 445 according to the arrow of NO without setting any attribute parameter to be applied, doing interactive page editing using the material view and the like.

If it is determined in step 425 that the theme function is used, processing proceeds to step 430 according to the arrow of YES. In step 430, a theme is set by the user for the editing target document 322 according to the navigation of the authoring software 350. The theme consists of a set of one or more attribute parameters to be applied to elements (including materials) within an editing target page, and the application of such a theme enables the editing target page to have a sense of unity.

Next, processing proceeds to step 435 to apply a sub-parameter. The sub-parameter indicates the degree of how much the theme is applied to the material to be inserted into the editing target document. Then, processing proceeds to step 440 to determine, based on the theme set in step 430 and the sub-parameter set in step 435, parameters finally to be applied to the material to be inserted into the editing target document.

Next, processing proceeds to step 445 to edit a page interactively using the material view and the like. In step 445, the user can operate the window shown in FIG. 9 to carry on creating content efficiently in an interactive manner. The details of step 445 will be described later with reference to FIGS. 5 and 6. An example of the window corresponding to the authoring software in step 445 will be described with reference to FIG. 9.

Processing proceeds to step 450. In step 450, it is determined whether the editing the target page to be edited is completed. If it is determined in step 450 that it is not completed, processing returns to step 445 according to the arrow of NO to continue editing the target document 322. If it is determined in step 450 that editing is completed, termination processing such as to store the edited content is performed, and processing proceeds to step 455 according to the arrow of YES to end.

Figure 5:
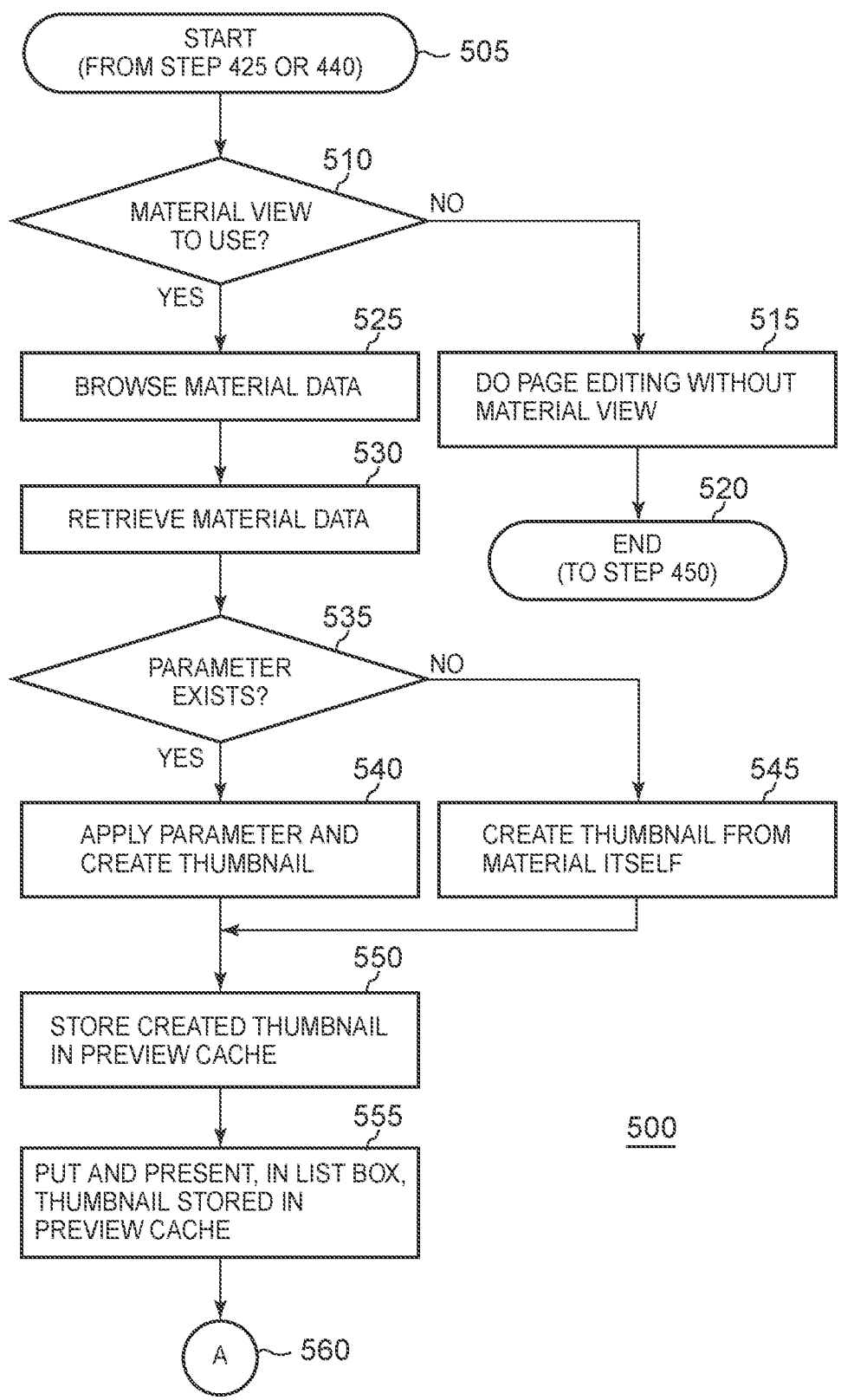
FIG. 5 is a flowchart (first half) illustrating the operation of the authoring system in an embodiment of the present invention.
Figure 6:
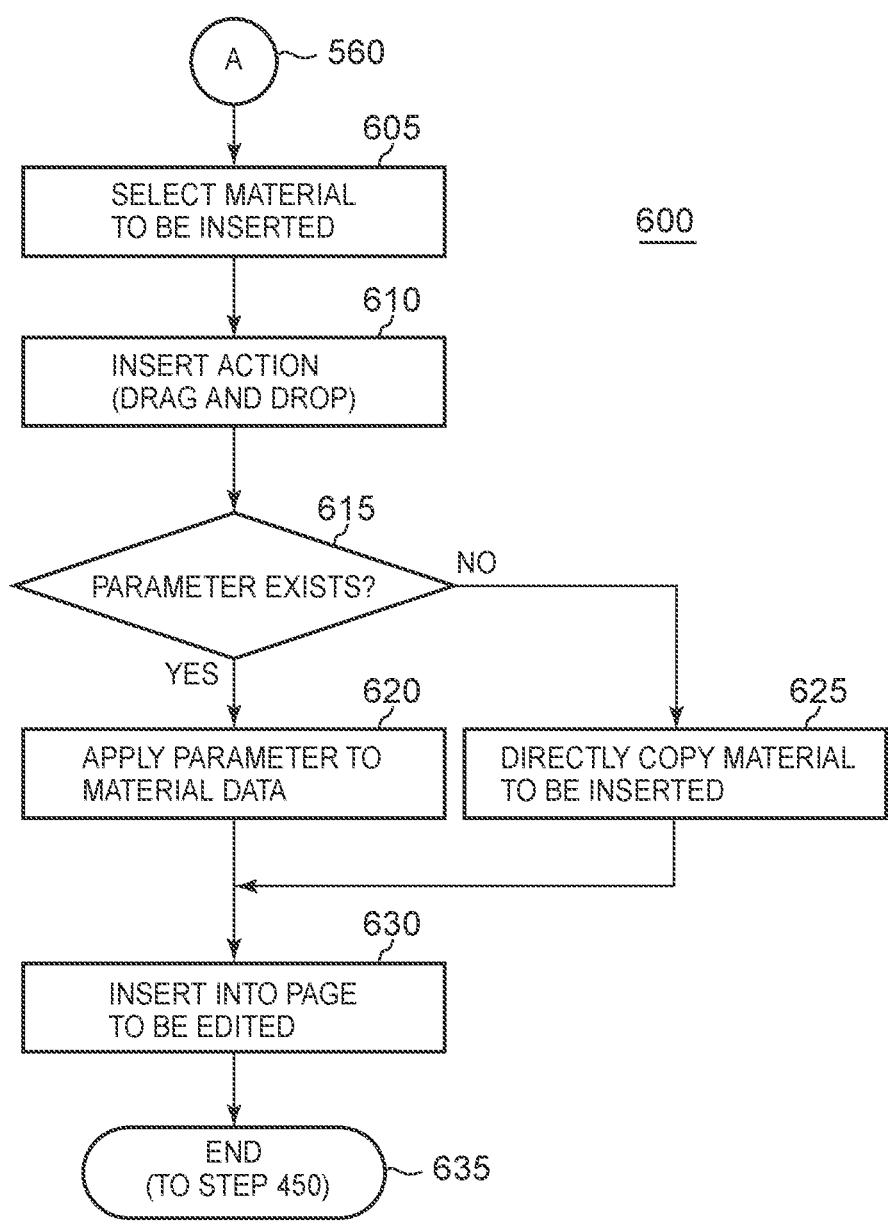
FIG. 6 is a flowchart (second half) illustrating the operation of the authoring system in an embodiment of the present invention.

Next, an example of the processing for a page editing using a material view 930 in step 445 of FIG. 4 will be described in further detail with reference to flowcharts 500 and 600 of FIG. 5 and FIG. 6. Processing starts at step 505, and in step 510, it is determined whether to use the material view 930.

If it is determined in step 510 that the material view 930 is not used, processing proceeds to step 515 according to the arrow of NO to do page editing without the material view 930. Since further detailed description of this page editing without the material view 930 is unnecessary, it will be omitted here. Next, processing proceeds to step 520 to end (go to step 450).

If it is determined in step 510 that the material view 930 is used, processing proceeds to step 525 according to the arrow of YES. In the embodiment of the present invention, when an instruction to display the material view 930 is given, the material view 930 is determined to be used. In the embodiment of the present invention, the instruction to display the material view 930 is given by clicking a tab labeled "material" but this is just an example and the way of giving the instruction is not limited to this. For example, such an instruction may, of course, be given via a menu bar 905 or a tool bar 910.

In step 525, a directory in which materials are stored is browsed in a material explorer 935 to explore necessary materials from material data stored in each directory of the material data storage 330. In an embodiment of the present invention, it is assumed that materials related to animals belonging to an illustration category of image materials are explored. Processing proceeds to step 530, and materials explored in step 530 are retrieved from a material database.

Then, processing proceeds to step 535 to determine whether there is a set of one or more attribute parameters to be applied to a material to be inserted into the editing target page. In an embodiment of the present invention, the set of attribute parameters is determined in step 440. Therefore, if a theme is set for the editing target page, it is determined that there is a set of attribute parameters. On the other hand, if no theme is set for the editing target page, it is determined that there is no set of attribute parameters.

If it is determined in step 535 that there is a set of attribute parameters, processing proceeds to step 540 according to the arrow of YES, and the set of attribute parameters is applied to the materials for preview clipped in step 530. As a result, the materials for preview are converted (changed in color, frame added, changed in brightness, etc.). After that, processing proceeds to step 550 to store the converted materials for preview in the preview cache 358.

On the other hand, if it is determined in step 535 that there is no set of attribute parameter, processing proceeds to step 545 according to the arrow of NO, in which the materials for preview clipped in step 530 are adopted intact as the final materials for preview. After that, processing proceeds to step 550 to store the materials for preview in the preview cache 358.

Then, processing proceeds to step 555, in which the materials for preview stored in step 550 in the preview cache 358 are put in a material box 940 as a list box and presented in such a manner that the user can select any of them. After that, processing moves to flowchart 600 shown in FIG. 6 via (A) 560.

Here, the user interface including the material view according to the embodiment of the present invention will be described. FIG. 9 shows an example (with theme unset) of the graphical user interface of the authoring system of the embodiment of the present invention. The window 900 includes the menu bar 905, the tool bar 910, an editing target page display area 915, an edit view 920, an HMTL source view 925, the material view 930, the material explorer 935, and the material box 940.

The menu bar 905 provides the user with various functions such as file operation and display control. Similarly, the tool bar 910 provides various functions, such as file operation and display control, as button icons. An existing editing target page is opened or a new page is created by using the menu bar 905 or the tool bar 910. Since these functions of the bars are well known, further detailed descriptions thereof will be omitted here.

The page display area 915 is an area in which the editing target page is displayed. The editing target page can be displayed in the page display area as the edit view 920 that is a WISIWIG editor or the HTML source view 925 that displays the editing target page in HTML format. The edit view 920 has the function of updating the display of the editing target page to the latest version in response to editing of the editing target page.

The material view 930 presents the user page components (image, animation, sound, and other page components) prepared in advance so that user can use these materials to create a page effectively. The material view 930 includes the material explorer 935 and the material box 940.

The user can use the material explorer 935 to browse the directory in which material data are stored. The material box 940 presents the user material data residing in the directory specified by the material explorer 935. Then, the user can select one of the materials presented in the material box 940 and perform a material insert action such as drag and drop to the page display area 915 of the edit view 920 to insert the selected material, thereby enabling effective creation of a content.

The user as a content creator can use the window 900 as an interactive graphical user interface of the authoring software 350 including these user interface elements 905 to 940 to edit the editing target document 322 in order to create a web content effectively.

Figure 9:
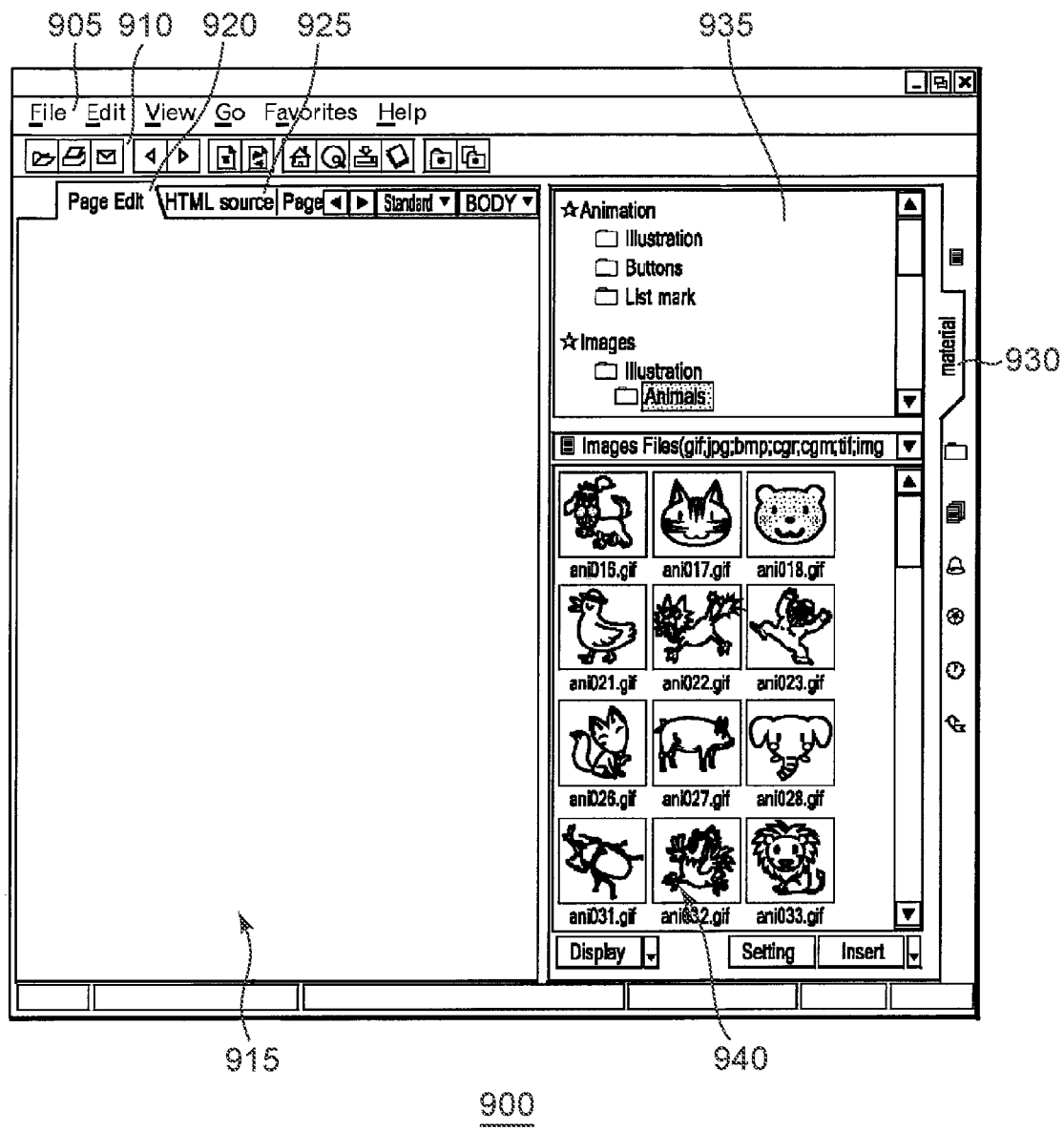
FIG. 9 is an illustration of an example of a graphical user interface (with theme unset) of the authoring system of an embodiment of the present invention.

Note that since no theme is set via the graphical user interface of the authoring system of an embodiment of the present invention shown in FIG. 9, the preview of materials shown in the material view consists of thumbnails of original materials themselves.

Figure 10:
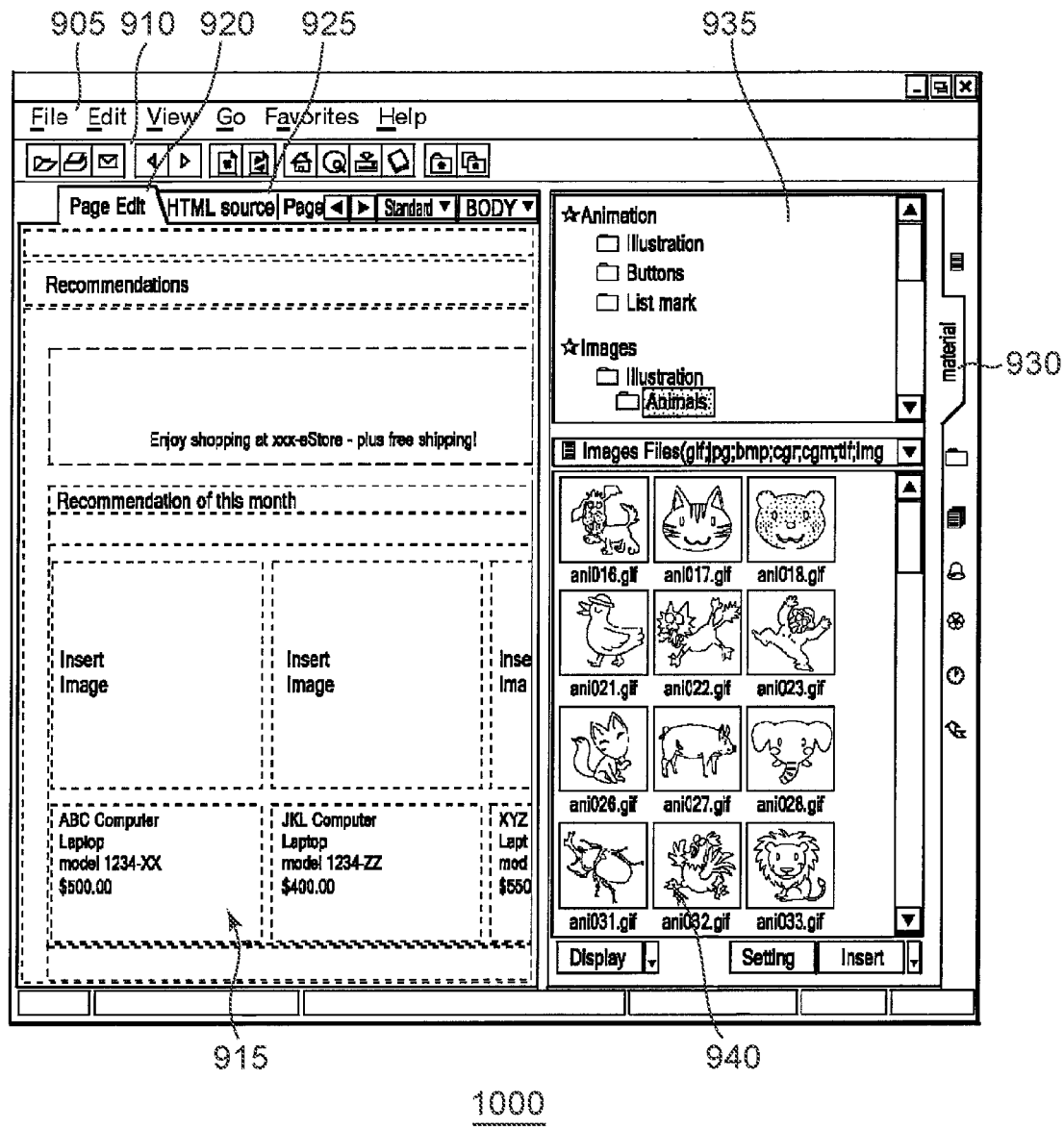
FIG. 10 is an illustration of another example of the graphical user interface (after theme is set and before material is inserted) of the authoring system of an embodiment of the present invention.

Referring next to FIG. 10, another example of the graphical user interface of the authoring system of an embodiment of the present invention when a theme is set together with a template is described. In the example shown in FIG. 10, it is assumed that "pastel monotone" is selected as the theme to be applied to the editing target page. Since the description of the theme "pastel monotone" has already been made with reference to FIG. 12, detailed description thereof will be omitted here. Note that since the theme "pastel monotone" is set for the editing target page, each material displayed in the material view 930 becomes more pastel monotone than that shown in FIG. 9.

Flowchart 600 starts from (A)560. Next, in step 605, a material to be inserted is selected in the material box 940. Then, processing proceeds to step 610, in which a certain material insert action is done, i.e., in the embodiment of the present invention, the material displayed in the material view is dragged and dropped onto the page in the edit view.

After the material insert action in step 610, processing proceeds to step 615 to determine whether there is a set of attribute parameters to be applied to the material within the editing target page. As mentioned above, in the embodiment of the present invention, this set of attribute parameters is determined in step 440. Therefore, if a theme is set for the editing target page, it is determined that there is a set of attribute parameters. On the other hand, if no theme is set for the editing target page, it is determined that there is no set of attribute parameters.

If it is determined in step 615 that there is a set of attribute parameters, processing proceeds to step 620 according to the arrow of YES, and the attribute parameters are applied to the material selected in step 605. As a result, the material is converted (changed in color, frame added, changed in brightness, etc.). After that, processing proceeds to step 630 to insert the converted material into the editing target document 322. Next, processing proceeds to step 635 to end (go to step 450).

If it is determined in step 615 that there is no attribute parameter, processing proceeds to step 625 according to the arrow of NO, in which the material selected in step 605 is adopted and copied as a material to be finally inserted as it is. After that, processing proceeds to step 630 to insert the material into the editing target document 322. Next, processing proceeds to step 635 to end (go to step 450).

Figure 11:
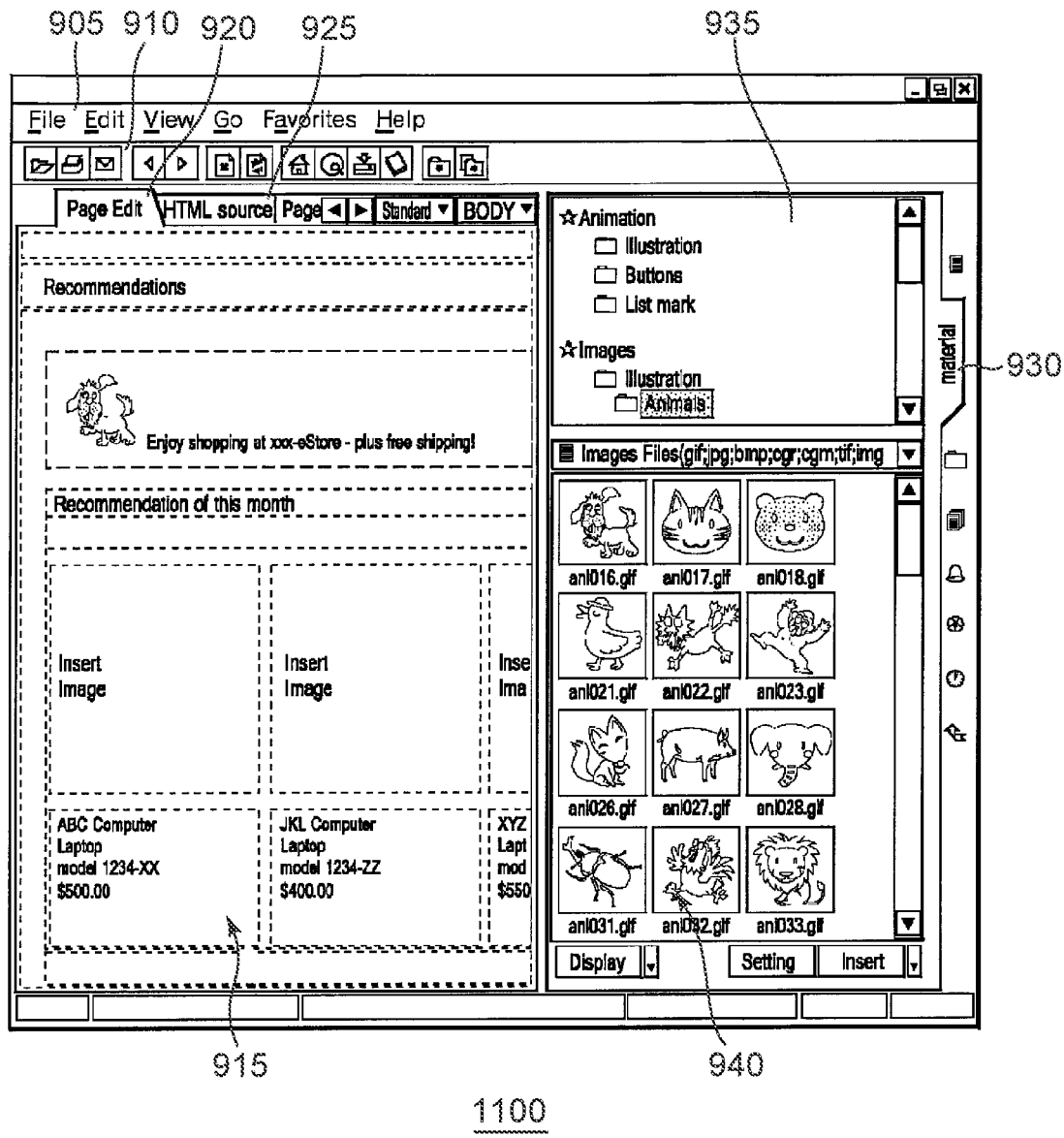
FIG. 11 is an illustration of an example of the graphical user interface (after theme is set and after material is inserted) of the authoring system of an embodiment of the present invention.

FIG. 11 shows still another example of the window (after inserting the material) corresponding to the authoring software 350 displayed on the display device of the authoring system 100 according to an embodiment of the present invention. Note that since "pastel monotone" is selected as the theme to be applied to the editing target page, the preview of materials displayed in the material view 930 and the material newly inserted in the editing target document displayed in the edit view 920 have become "pastel monotone."

Figure 7:
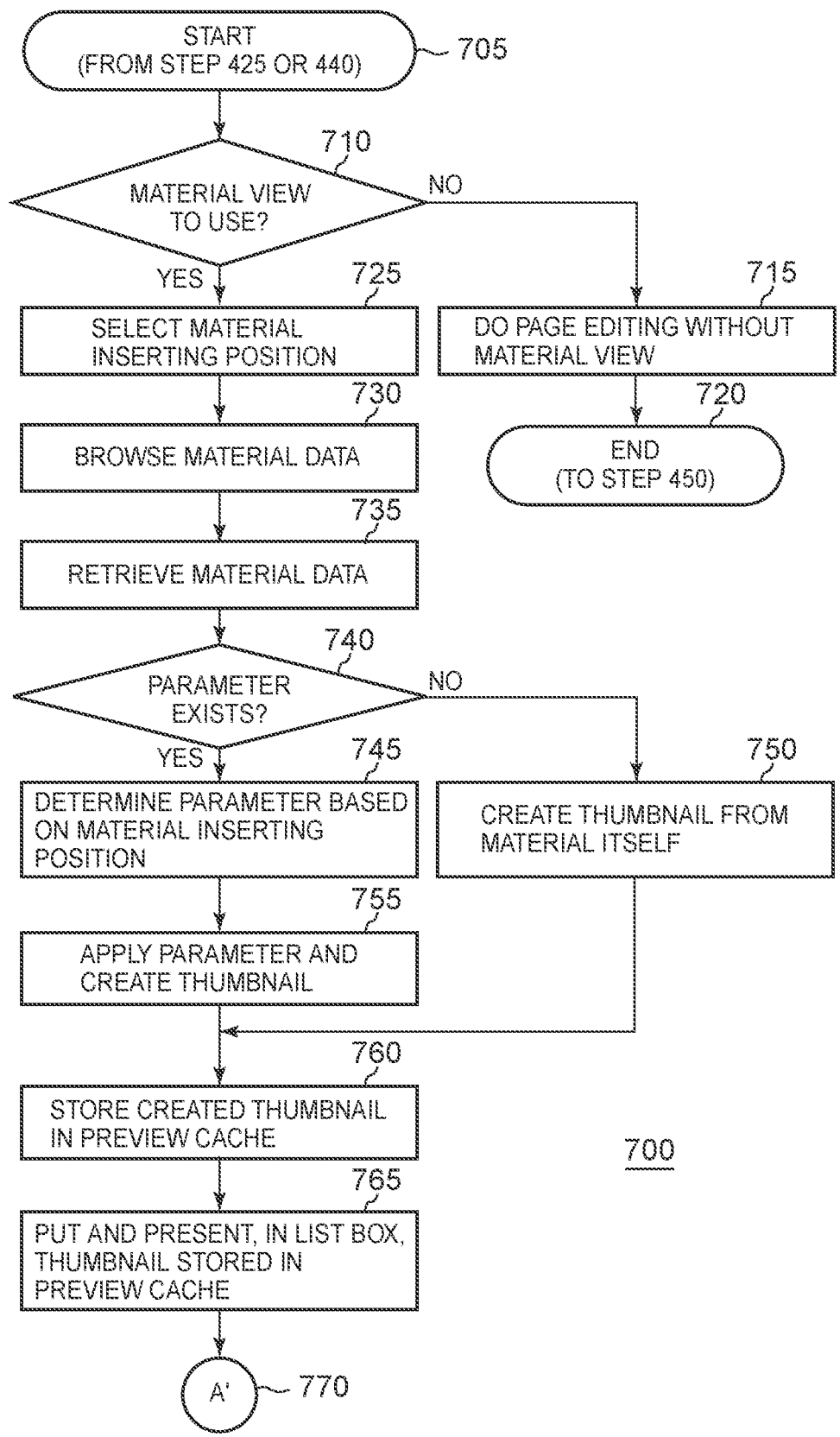
FIG. 7 is a flowchart (first half) illustrating the operation of the authoring system in an embodiment of the present invention.
Figure 8:
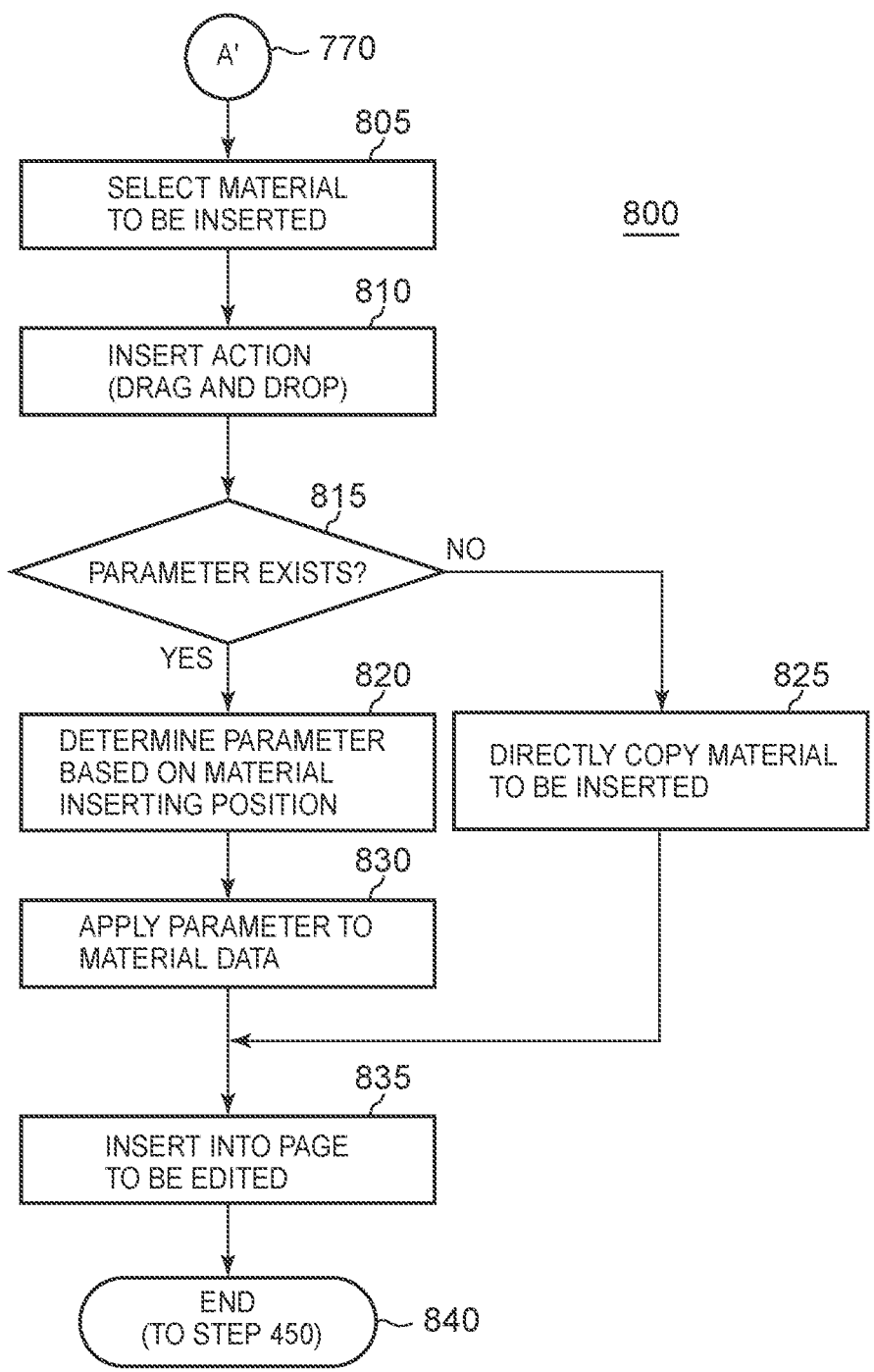
FIG. 8 is a flowchart (second half) illustrating the operation of the authoring system in an embodiment of the present invention.

Referring next to flowcharts 700 and 800 of FIG. 7 and FIG. 8, another example of page editing processing using the material view 930 and the like in step 435 of FIG. 4 will be described. In this example, parameters to be applied can correspond to different themes depending on the position at which a material is to be inserted in the editing target page.

Flowcharts 700 and 800 are almost the same as flowcharts 500 and 600, and the processing content of each corresponding step is essentially the same. However, note that selection of a material inserting position in step 725, parameter determination depending on the material inserting position in step 745, and parameter determination depending on the material inserting position in step 820 are added in this example. In such steps, for example, the material inserting position is selected by clicking a position at which the material is expected to be inserted in the edit view. A set of attribute parameters to be applied to the material is determined depending on the selection. The determined set of attribute parameters is applied to form a preview displayed in the material view and the material to be inserted in the edit view.

As an example, in order to carry out these steps, a file describing correspondences between positions in the editing target document and attribute parameters to be applied is stored in the system so that the file can be used to determine, in steps 745 and 820, attribute parameters to be applied to the material inserting position selected in step 725. In the file, a position in the editing target document can be specified using position information on a tag configuration represented by XPath or the like, or a style selector to select a style, such as class, ID, or tag, can be used to specify the position. However, the way of specifying the position is not limited to these.

FIG. 13 and FIG. 14 show an example of the editing target document 322 created according to an HTML specification in the embodiment of the present invention. FIG. 13 shows an HTML source before a material is inserted and FIG. 14 shows the HTML source after the material is inserted. Note that, in the editing target document before the immaterial is inserted as shown in FIG. 13, a CSS (Cascading Style Sheets) file ("hpb9tm05_8.css") associated with a selected theme (i.e., specified in a theme file) is designated. The designation of the CSS file in this editing target document can be changed by changing the theme.

In the embodiment of the present invention, a set of attribute parameters of a theme file to be applied to the editing target page is identified. Note that, in the page after the material is inserted as shown in FIG. 13, the material ("file:///C:/DocumentsandSettings/user/ApplicationData/application/tmp/hb9tm05_8/ani016.gif") converted by applying thereto the set of attribute parameters included in the theme file is inserted.

As mentioned above, although the example of the editing target document 322 as a web page created according to the HTML specification in the embodiment of the present invention has been described with reference to FIG. 13 and FIG. 14, the details of the HTML specification are well known to those skilled in the art as described in Non-Patent Document 3 and the like. Therefore, since those skilled in the art who has read this specification can make additions to and changes in the content, further detailed description will be omitted.

As described above, according to an embodiment of the present invention, there can be provided an authoring system, software, and method for efficiently supporting editing and creation of an electronic document (page) as a web content. It will be readily appreciated that the productivity of users who operate a content authoring system to create contents can be enhanced.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A system comprising:

one or more processors, one or more computer-readable memories and one or more computer-readable, tangible storage devices;

program instructions, stored on the one or more computer-readable, tangible storage devices for execution by the one or more processors via the one or more computer-readable memories, to identify a theme for application into a document;

program instructions, stored on the one or more computer-readable, tangible storage devices for execution by the one or more processors via the one or more computer-readable memories, to determine a set of attribute parameters associated with the identified theme;

program instructions, stored on the one or more computer-readable, tangible storage devices for execution by the one or more processors via the one or more computer-readable memories, to apply the identified theme to a set of image files insertable into the document by converting the set of image files according to one or more attribute parameters of the set of attribute parameters;

program instructions, stored on the one or more computer-readable, tangible storage devices for execution by the one or more processors via the one or more computer-readable memories, to display the document and a preview of the set of converted image files;

program instructions, stored on the one or more computer-readable, tangible storage devices for execution by the one or more processors via the one or more computer-readable memories, to allow the user to select some attribute parameters of the set of attribute parameters to be applied to the document, wherein a preview of image files to which some of the selected attribute parameters have been applied is displayed;

program instructions, stored on the one or more computer-readable, tangible storage devices for execution by the one or more processors via the one or more computer-readable memories, to set a sub-parameter for the identified theme;

program instructions, stored on the one or more computer-readable, tangible storage devices for execution by the one or more processors via the one or more computer-readable memories, to apply the sub-parameter to the set of image files to be inserted into the document and create the preview of the set of applied image files which includes the set of image files to be inserted into the document; and program instructions, stored on the one or more computer-readable, tangible storage devices for execution by the one or more processors via the one or more computer-readable memories, to edit a page interactively of the document using the preview of the set of applied image files by inserting an image file of the set of image files into the document.

2. The system according to claim 1, further comprising:
program instructions, stored on the one or more computer-readable, tangible storage devices for execution by the one or more processors via the one or more computer-readable memories, to set a degree to which the identified theme is to be applied to the one or more image files to be inserted into the document, wherein the preview is formed such that a user is able to select one or more image files from the preview of the set of converted image files for insertion into the document; and program instructions, stored on the one or more computer-readable, tangible storage devices for execution by the one or more processors via the one or more computer-readable memories, to display the material view by clicking a tab in the document.

3. The system according to claim 1, further comprising:
program instructions, stored on the one or more computer-readable, tangible storage devices for execution by the one or more processors via the one or more computer-readable memories, to accept a selection of a position at which an image file of the set of image files is inserted into the document, wherein the set of attribute parameters is determined depending on the selected position to display a preview of the image file to which at least some of the determined set of attribute parameters have been applied; and program instructions, stored on the one or more computer-readable, tangible storage devices for execution by the one or more processors via the one or more computer-readable memories, to browse a material explorer from the set of image files to be inserted into the document stored in each directory of a material data storage.

4. The system according to claim 1, further comprising:
program instructions, stored on the one or more computer-readable, tangible storage devices for execution by the one or more processors via the one or more computer-readable memories, to insert into the document the image files to which some of the selected attribute parameters have been applied.

5. The system according to claim 1, further comprising:
program instructions, stored on the one or more computer-readable, tangible storage devices for execution by the one or more processors via the one or more computer-readable memories, to apply the identified theme to at least one of the image files in response to a predetermined user action and inserting the image files into the document.

6. The system according to claim 5, wherein the predetermined user action is drag-and-drop action of the preview.

7. The system according to claim 1, further comprising:
program instructions, stored on the one or more computer-readable, tangible storage devices for execution by the one or more processors via the one or more computer-readable memories, to, when at least one of the image files is to be inserted, apply at least some attribute parameters of the set of attribute parameters associated with the identified theme are applied to convert the image files.

8. The system according to claim 1, further comprising:
program instructions, stored on the one or more computer-readable, tangible storage devices for execution by the one or more processors via the one or more computer-readable memories, to store a plurality of themes, wherein the identified theme identifies the theme selected by the user from the plurality of themes.

9. The system according to claim 1, wherein the set of attribute parameters to be applied to the image files to be inserted into the document is stored in one or more files separately from the document.

10. The system according to claim 9, wherein the separate one or more files include a definition of cascading style sheets called for the document.

11. The system according to claim 1, wherein the preview consists of thumbnails of the image files.

12. The system according to claim 1, wherein the set of attribute parameters include at least one of parameters of a theme color, a theme background color, a color translation, a shape transformation, a conversion to add a frame, a contrast conversion, a temperature conversion, and a color temperature conversion.

13. The system according to claim 1, wherein the document is a multimedia structured document.

14. The system according to claim 1, wherein the document is created in an HTML or XML format.

15. The system according to claim 1, wherein the image files include at least one of image data, animation data, vector data, text data, and HTML data.

16. A method comprising:
at least one processor, executing program instructions stored in a storage device, identifying a theme for application to a document;
at least one processor, executing program instructions stored in the storage device, determining a set of attribute parameters associated with the identified theme;
at least one processor, executing program instructions stored in the storage device, applying the identified theme to a set of image files insertable into the document by converting the set of image files according to one or more attribute parameters of the set of attribute parameters;
at least one processor, executing program instructions stored in the storage device, setting a sub-parameter for the identified theme;
at least one processor, executing program instructions stored in the storage device, applying the sub-parameter to the set of image files to be inserted into the document;
at least one processor, executing program instructions stored in the storage device, displaying the document and a preview of the set of converted image files; and
at least one processor, executing program instructions stored in the storage device, editing a page interactively of the document using the preview by inserting an image file of the set of converted image files into the document.

17. The method of claim 16, further comprising:
at least one processor, executing program instructions stored in the storage device, setting a degree to which the theme is to be applied to one or more image files, wherein the preview is formed for selection of one or more image files from the set of converted image files by a user for insertion into the document.

18. The method of claim 16, wherein the preview consists of thumbnails of the image files, wherein the document is a multimedia structured document, wherein the document is created in an HTML or XML format.

19. A computer program product comprising:
one or more computer-readable storage devices;
program instructions, stored on the one or more computer-readable storage devices, to identify a theme to be applied to a document;
program instructions, stored on the one or more computer-readable storage devices, to determine a set of attribute parameters associated with the identified theme; and
program instructions, stored on the one or more computer-readable storage devices, to apply the identified theme to a set of image files insertable into the document by converting the set of image files according to one or more attribute parameters of the set of attribute parameters;
program instructions, stored on the one or more computer-readable storage devices, to set a sub-parameter for the identified theme;
program instructions, stored on the one or more computer-readable storage devices, to apply the sub-parameter to the set of image files to be inserted into the document;
program instructions, stored on the one or more computer readable storage devices, to display the document and a preview of the set of converted image files; and
program instructions, stored on the one or more computer-readable storage devices, to edit a page interactively of the document using the preview by inserting an image file of the set of converted image files into the document.

* * * * *